United States Patent
Xu et al.

(10) Patent No.: US 12,176,120 B2
(45) Date of Patent: Dec. 24, 2024

(54) METHOD FOR SYNERGISTICALLY VITRIFYING MEDIUM AND LOW-LEVEL RADIOACTIVE GLASS FIBERS AND COMBUSTIBLE SOLID NUCLEAR WASTE INCINERATION ASHES

(71) Applicant: WUHAN UNIVERSITY OF TECHNOLOGY, Hubei (CN)

(72) Inventors: Kai Xu, Hubei (CN); Guang Fang, Hubei (CN); Zifan Wang, Hubei (CN); Kaiwen Hu, Hubei (CN); Xiujian Zhao, Hubei (CN)

(73) Assignee: WUHAN UNIVERSITY OF TECHNOLOGY, Hubei (CN)

( * ) Notice: Subject to any disclaimer, the term of this patent is extended or adjusted under 35 U.S.C. 154(b) by 753 days.

(21) Appl. No.: 17/527,175

(22) Filed: Nov. 16, 2021

(65) Prior Publication Data
US 2022/0172854 A1 Jun. 2, 2022

(30) Foreign Application Priority Data
Nov. 16, 2020 (CN) .......................... 202011278158.7

(51) Int. Cl.
| | | |
|---|---|---|
| *G21F 9/30* | (2006.01) | |
| *C03C 3/097* | (2006.01) | |
| *G21F 9/36* | (2006.01) | |

(52) U.S. Cl.
CPC .............. *G21F 9/305* (2013.01); *C03C 3/097* (2013.01); *G21F 9/36* (2013.01)

(58) Field of Classification Search
CPC ... G21F 9/30; G21F 9/305; G21F 9/36; C03C 3/097
USPC ........................................................ 588/11
See application file for complete search history.

(56) References Cited

FOREIGN PATENT DOCUMENTS

| CN | 104310781 | 1/2015 |
| CN | 104318971 | 10/2017 |
| CN | 105814000 | 9/2018 |

*Primary Examiner* — Edward M Johnson
(74) *Attorney, Agent, or Firm* — JCIPRNET

(57) ABSTRACT

The present invention provides a method for synergistically vitrifying medium and low-level radioactive glass fibers and combustible solid nuclear waste incineration ashes. According to the chemical composition characteristics of incineration ashes of combustible solid wastes such as glass fibers, cotton, plastic, rubber and absorbent paper produced during the operation of nuclear facilities, the present invention takes the glass fibers as a glass matrix of combustible waste incineration ashes and minimizes the addition of an additive by a combination in different proportions through a synergistic treatment method. A vitrified form provided by the present invention meets the requirements of uniformity, density, impact resistance, chemical durability and the like of radioactive waste vitrified forms.

9 Claims, 2 Drawing Sheets

METHOD FOR SYNERGISTICALLY VITRIFYING MEDIUM AND LOW-LEVEL RADIOACTIVE GLASS FIBERS AND COMBUSTIBLE SOLID NUCLEAR WASTE INCINERATION ASHES

CROSS-REFERENCE TO RELATED APPLICATION

This application claims the priority benefit of China application serial no. 202011278158.7, filed on Nov. 16, 2020. The entirety of the above-mended patent application is hereby incorporated by reference here and made a part of this specification.

BACKGROUND

Technical Field

The present disclosure relates to a method for synergistic treatment of glass fibers and combustible solid nuclear wastes, particularly relates to a method for synergistically vitrifying medium and low-level radioactive glass fibers and incineration ashes of combustible solid nuclear wastes such as cotton, plastic, rubber and absorbent paper, and belongs to the field of immobilization treatment of nuclear wastes.

Description of Related Art

The scale of nuclear power units under construction in China has maintained the first in the world for a long time in recent years. It is estimated that the scale of nuclear power development will reach 130 million kilowatts in 2030, accounting for nearly 10% of power generation. However, the increasing stock of nuclear wastes brings challenges to sustainable development of nuclear power in China. Nuclear wastes are divided into a high-level waste, a medium-level waste and a low-level waste according to radioactive levels, where there are more than 97% (volume percentage) of medium and low-level wastes, which mainly come from glass fibers and combustible wastes such as cotton, plastic, rubber and absorbent paper. The glass fibers are a high-efficiency filter material generally used in ventilation systems of nuclear facilities and an anti-corrosive material used in water pipelines. The combustible wastes such as cotton, plastic, rubber and absorbent paper mainly come from nuclear protection and overhauling of nuclear facilities.

At present, in the nuclear power plants, glass fibers are treated mainly by means of cement immobilization, and combustible wastes such as cotton, plastic, rubber and absorbent paper are treated by compression in barrels. However, problems such as waste volume expansion and poor leaching resistance of a waste form exist in cement immobilization. The way of compression in barrels is limited in volume reduction, and nuclides are not effectively immobilized. Both the two current treatment methods bring economic burden and potential safety hazards to subsequent disposal.

Vitrification is a technology for forming a glass form by means of high-temperature melting and pouring after mixing nuclear wastes with a certain proportion of glass additives. Vitrification is featured with a high volume reduction ratio and a high leaching resistance of a vitrified form. Involved in a high-temperature (about 1200° C.) process, vitrification has higher equipment investment and operation cost, and accordingly is usually only used for vitrifying high-level liquid waste. However, if the later disposal cost and potential safety hazards are comprehensively considered, vitrification also has certain advantages in treatment of medium and low-level wastes. For example, South Korea has begun to use vitrification method to treat the medium and low-level wastes generated by its nuclear power plants, and low-activity wastes at Hanford Site in the United States will be vitrified as well.

The existing patented technologies for vitrification of medium and low-level radioactive glass fibers and combustible nuclear wastes such as cotton include: (1) Glass Matrix Composition for Medium and Low-Level Radioactive Glass Fiber and Vitrified Form Prepared from Glass Matrix Composition (Chinese Patent Application No. 201410534248.6) invented by Zhang Jinsong et al. discloses a composition of an additive required for vitrifying medium and low-level radioactive glass fibers. (2) Glass Matrix Composition for Medium and Low-level Radioactive Combustible Waste Incineration Ashes and Vitrified Form Prepared from Glass Matrix Composition (Chinese Patent Application No. 201410534421.2) invented by Zhang Jinsong et al. provides a glass additive composition suitable for vitrifying incineration ashes of cotton, plastic, rubber and absorbent paper, respectively. (3) Glass Composition for Vitrification of Mixed Wastes and Method for Vitrifying Mixed Wastes Using Glass Composition (Chinese Patent Application No. 201380081452.0) invented by Jin Dewan et al. develops a glass additive composition suitable for vitrifying combustible mixed waste incineration ashes according to the actually produced combustible mixed wastes such as gloves, overalls, plastic and rubber.

In the existing patents related to vitrification of radioactive glass fibers and combustible waste ashes, a large proportion of glass additives (glass forming chemicals) need to be introduced to meet the requirements of a melting process and the performance of a vitrified form. In a vitrification process of nuclear wastes, in order to minimize a volume of a vitrified form and relieve a later disposal pressure, the content of a glass additive should be generally minimized in a formula design process. Therefore, there is a directional deviation between the existing implementation methods and the design requirements, and those skilled in the art are committed to overcoming this deviation.

SUMMARY

The present disclosure aims to provide a method for synergistically vitrifying medium and low-level radioactive glass fibers and incineration ashes of combustible solid nuclear wastes such as cotton, plastic, rubber and absorbent paper, so as to reduce an amount of glass additives and increase a volume reduction ratio.

To achieve the above purpose, the present disclosure provides a method for synergistically vitrifying medium and low-level radioactive glass fibers and combustible solid nuclear waste incineration ashes, including the following steps of:

incinerating a combustible solid nuclear waste to obtain ashes, where the combustible solid nuclear waste is selected from one or more of cotton, plastic, rubber and absorbent paper; and
  mixing the glass fibers, the ashes and an additive in proportion to prepare a mixed waste vitrified form;
  where the glass fibers, the ashes and the additive are in proportion as follows (in terms of oxides):
  5 wt % to 90 wt % of the glass fibers,
  10 wt % to 90 wt % of the ashes, and
  not more than 10 wt % of the additive, and a total content of the glass fibers, the ashes and the additive is 100 wt %.

In some embodiments, the glass fibers, the ashes and the additive are fully mixed to obtain a resulting mixture, and then the following steps are conducted:

maintaining the resulting mixture at 1100° C. to 1400° C. for 1 to 3 hours to obtain a glass melt;

pouring and molding the glass melt to prepare a vitrified form; and annealing the vitrified form at 500° C. to 600° C., maintaining the temperature for 1 to 3 hours, and then naturally cooling to room temperature to obtain the mixed waste vitrified form.

In some embodiments, the additive includes one or a combination of more of CaO, $Li_2O$, $Na_2O$ and $B_2O_3$, where CaO is introduced in a form of $CaCO_3$, $Li_2O$ is introduced in a form of $Li_2CO_3$, $Na_2O$ is introduced in a form of $Na_2CO_3$, and $B_2O_3$ is introduced in a form of $B_2O_3$ or $H_3BO_3$.

In some embodiments, the mixed waste vitrified form includes: 30 wt % to 55 wt % of $SiO_2$, 5 wt % to 35 wt % of CaO, 2 wt % to 15 wt % of $B_2O_3$, 5 wt % to 10 wt % of $Al_2O_3$, 5 wt % to 12 wt % of $Na_2O$, 1 wt % to 6 wt % of $K_2O$, 0 wt % to 12 wt % of $TiO_2$, 1 wt % to 5 wt % of BaO, 1 wt % to 5 wt % of ZnO, 0 wt % to 5 wt % of MgO, 0 wt % to 1 wt % of $Fe_2O_3$, 0 wt % to 5 wt % of $P_2O_5$, and 0 wt % to 1 wt % of $SO_3$.

In some embodiments, the mixed waste vitrified form further includes: $Co_2O_3$, SrO and $Cs_2O$, each of which has a content not higher than 1 wt %.

In some embodiments, the combustible solid nuclear waste is selected from any one of the cotton, the plastic, the rubber and the absorbent paper.

In some embodiments, the combustible solid nuclear waste is selected from any two of the cotton, the plastic, the rubber and the absorbent paper.

Preferably, when the combustible solid nuclear waste is selected from any two of the cotton, the plastic, the rubber and the absorbent paper, there are 40 wt % to 65 wt % of the glass fibers, 35 wt % to 50 wt % of the ashes and not more than 10 wt % of the additive, and the total content of the three is 100 wt %.

In some embodiments, the combustible solid nuclear waste is selected from any three of the cotton, the plastic, the rubber and the absorbent paper.

Preferably, when the combustible solid nuclear waste is selected from any three of the cotton, the plastic, the rubber and the absorbent paper, there are 55 wt % to 70 wt % of the glass fibers, 25 wt % to 45 wt % of the ashes and not more than 10 wt % of the additive, and the total content of the three is 100 wt %.

In some embodiments, the combustible solid nuclear waste is a combination of the cotton, the plastic, the rubber and the absorbent paper.

Preferably, when the combustible solid nuclear waste is selected from any four of the cotton, the plastic, the rubber and the absorbent paper, there are 50 wt % to 65 wt % of the glass fibers, 25 wt % to 40 wt % of the ashes and not more than 10 wt % of the additive, and the total content of the three is 100 wt %.

In the above technical solutions of the present disclosure, the cotton, the plastic, the rubber or the absorbent paper is a combustible solid waste generated during the operation of nuclear facilities.

In the above solutions, the medium and low-level radioactive glass fibers include medium-level radioactive glass fibers and/or low-level radioactive glass fibers.

The present disclosure has the following beneficial effects.

(1) The glass fibers are mixed with the combustible waste ashes in proportion according to the glass-forming characteristics of the glass fibers, and the amount of the additive is reduced to 10 wt % or below, so that a total waste loading of the medium and low-level radioactive glass fibers and the combustible solid nuclear waste incineration ashes is increased to be 90 wt % or higher.

(2) The prepared vitrified form has a good chemical durability and can effectively prevent the migration of radionuclides to the environment.

(3) According to the present disclosure, the process for preparing a vitrified form is simple, can be implemented in a plasma melting furnace, a ceramic electric melting furnace or a cold crucible melting furnace, and has a good application prospect.

DESCRIPTION OF THE EMBODIMENTS

Figure 1:
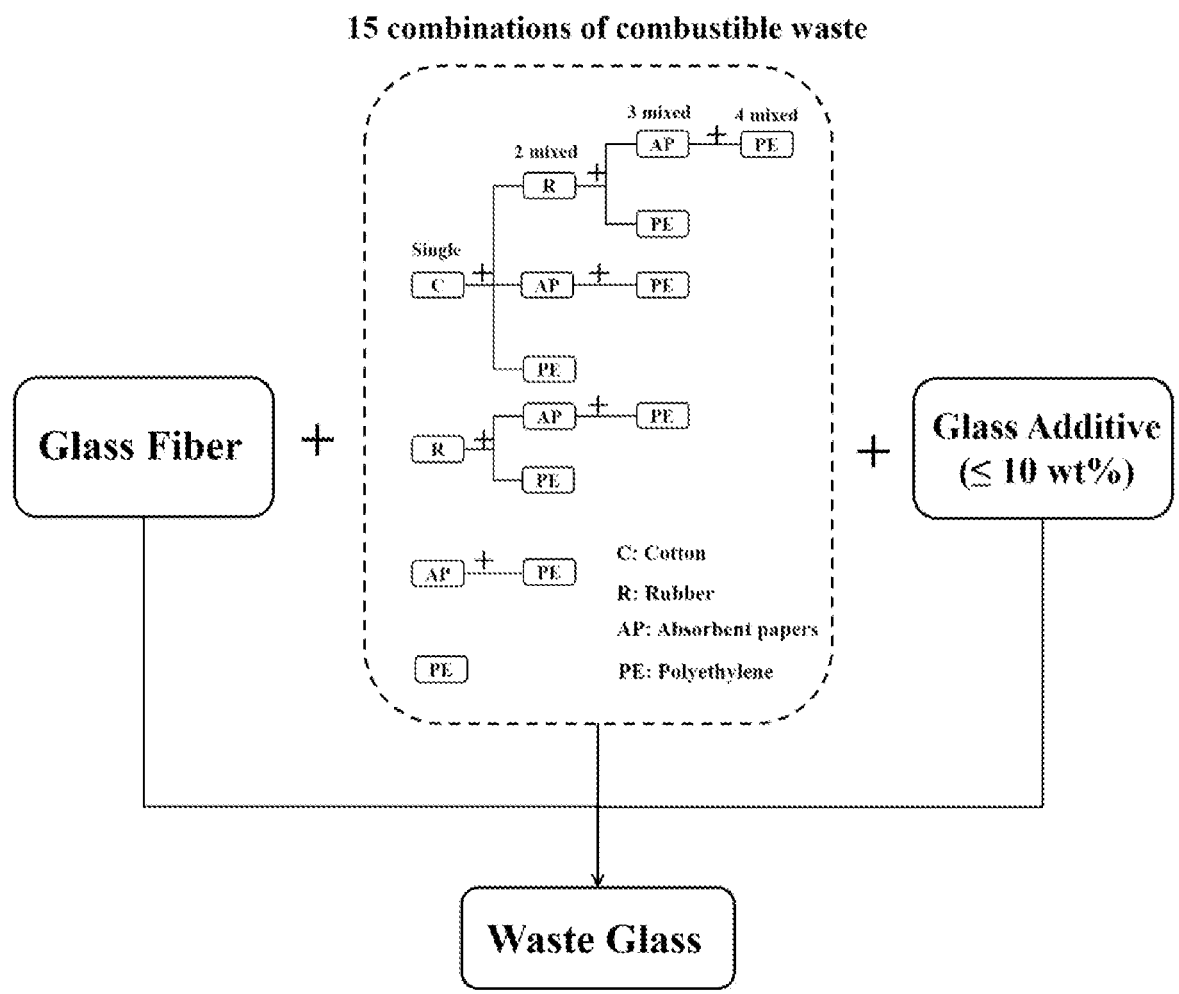
FIG. 1 is a schematic diagram of a synergistic vitrification route of the present disclosure.

Unless otherwise defined, the technical or scientific terms used in the claims and specifications of this patent shall have the general meanings understood by those of general skill in the technical field to which this patent belongs. Similar words such as "include" or "have" mean that the elements or objects appearing before "include" or "have" cover the elements, objects or their equivalent elements listed after "include" or "have", and do not exclude other elements or objects.

As a consumable material used in a large quantity, glass fibers are a high-efficiency filter material generally used in ventilation systems of nuclear power plants and an anti-corrosive material used in water pipelines. Glass fibers used in a nuclear power plant are radioactive and occupies a large space, so glass fibers are generally melted to realize volume reduction. As a glassy material, glass fibers can be treated to form a final product of transparent glass under a thermal treatment condition at a temperature of 1400° C. to 1500° C. However, due to a high viscosity, the final product is not prone to being discharged from a vitrification melting furnace. Therefore, an additive is additionally added to reduce the viscosity of glass at a high temperature.

Nuclear power plant operators should wear cotton overalls, which should be replaced frequently. Most of the combustible wastes generated during the operation of nuclear power plants are cotton. In addition, the combustible wastes further include rubber gloves, absorbent paper, plastic products, etc. Most of the plastic is polyethylene (PE). The safe treatment of the above solid wastes is a problem that cannot be ignored. Cotton, rubber, plastic and paper are all combustible materials, which can be fully incinerated first, so that the volume and weight are both greatly reduced, and the weight can be reduced by 90% or above. The ashes generated after incineration of the above solid wastes are some inorganic oxides, which are subsequently analyzed and treated.

Components of the ashes are analyzed by using X-ray fluorescence spectrometer (XRF) and an inductively coupled plasma optical emission spectrometer (ICP-OES). Cotton ash mainly includes the components of $SiO_2$, $TiO_2$, BaO, $Na_2O$ and CaO; plastic ash mainly includes the components of $SiO_2$, $Al_2O_3$ and CaO; rubber ash mainly includes the component of CaO; and absorbent paper ash mainly includes the components of $TiO_2$, $Na_2O$ and CaO. According to the above data, most of the ashes obtained after full incineration of cotton, plastic, rubber and absorbent paper contain CaO and $Na_2O$, which are an additive commonly used to lower the viscosity of glass at a high temperature. On the other hand, glass fibers are a glass matrix, which can be mixed with ashes of combustible wastes such as cotton, plastic, rubber and absorbent paper. Through a formula design, a glass formula meeting the requirements of a melting process and the performance of a vitrified form of nuclear wastes is formed. The present disclosure is developed based on the above concept.

Incineration ashes of combustible wastes such as cotton, plastic, rubber and absorbent paper have great differences in composition, which is a difficulty of a glass formula design. Therefore, based on comprehensive consideration on an oxide composition of glass fibers and combustible waste incineration ashes, as well as Co, Sr and Cs oxides (each tracer agent oxide is designed to be 0.2 wt % in terms of 100 wt % of an oxide of a final vitrified form) added as tracer agents, the present disclosure takes glass fibers as a glass matrix, which are mixed with ashes of one or more of combustible solid wastes such as cotton, plastic, rubber and absorbent paper; by the formula design and experiment, the amount of an additional additive for each mixed waste is minimized, and thus synergistic vitrification for radioactive glass fibers and combustible nuclear waste incineration ashes is implemented. In this way, the amount of a glass additive is minimized, and a controlled volume of a vitrified form is achieved.

Therefore, the present disclosure provides a method for synergistically vitrifying medium and low-level radioactive glass fibers and combustible solid nuclear waste incineration ashes, which includes the following steps.

Step 1, a combustible solid nuclear waste is incinerated to obtain ashes, where the combustible solid nuclear waste is selected from one or more of cotton, plastic, rubber and absorbent paper. For example, the combustible solid nuclear waste is selected from: (1) any one of the cotton, the plastic, the rubber and the absorbent paper; (2) any two of the cotton, the plastic, the rubber and the absorbent paper; (3) any three of the cotton, the plastic, the rubber and the absorbent paper; and (4) a combination of the cotton, the plastic, the rubber and the absorbent paper.

The combustible solid nuclear waste should be fully incinerated as far as possible, so that volatile elements such as carbon, hydrogen and nitrogen are completely removed, and finally only solid inorganic oxides remain in the ashes. During large-scale incineration, the combustible solid nuclear waste is allowed to contain a small amount of carbon, hydrogen, nitrogen and other elements on the premise of meeting certain standards. For example, residual carbon in the ashes should be less than 5% of the total carbon in the combustible solid nuclear waste before incineration.

The cotton is maintained at a temperature of 460° C. or higher for 1 hour or above until $H_2O$ and $CO_2$ are completely removed, and only inorganic oxides are left. At the moment, full incineration is realized, and these inorganic oxides are cotton ash. The cotton ash includes the following components in percentage by weight: 10 wt % to 40 wt % of $SiO_2$, 1 wt % to 8 wt % of $Na_2O$, 1 wt % to 5 wt % of $K_2O$, 2 wt % to 10 wt % of $Al_2O_3$, 5 wt % to 75 wt % of CaO, 0 wt % to 6 wt % of MgO, 0 wt % to 15 wt % of BaO, 0 wt % to 15 wt % of $TiO_2$, 0 wt % to 3 wt % of $Fe_2O_3$, 0 wt % to 5 wt % of $P_2O_5$, and 0 wt % to 2 wt % of $SO_3$.

The plastic is maintained at a temperature of 510° C. or higher for 1 hour or above until $H_2O$ and $CO_2$ are completely removed, and only inorganic oxides are left. At the moment, full incineration is realized, and these inorganic oxides are PE ash. The PE ash includes the following components in percentage by weight: 60 wt % to 70 wt % of $SiO_2$, 5 wt % to 30 wt % of $Al_2O_3$, 10 wt % to 20 wt % of CaO, and 1 wt % to 3 wt % of MgO.

The rubber is maintained at a temperature of 730° C. or higher for 1 hour or above until $H_2O$ and $CO_2$ are completely removed, and only inorganic oxides are left. At the moment, full incineration is realized, and these inorganic oxides are rubber ash. The rubber ash includes the following components in percentage by weight: 80 wt % to 90 wt % of CaO, 0 to 8 wt % of $TiO_2$, 0 wt % to 5 wt % of MgO, 0 wt % to 5 wt % of ZnO, 0.5 wt % to 2 wt % of $SiO_2$, 0.1 wt % to 1 wt % of $Al_2O_3$, and 1 wt % to 5 wt % of $SO_3$.

The absorbent paper is maintained at a temperature of 480° C. or higher for 1 hour or above until $H_2O$ and $CO_2$ are completely removed, and only inorganic oxides are left. At the moment, complete incineration is realized, and these inorganic oxides are absorbent paper ash. The absorbent paper ash includes the following components in percentage by weight: 50 wt % to 60 wt % of $TiO_2$, 10 wt % to 50 wt % of CaO, 0 wt % to 30 wt % of $SiO_2$, 10 wt % to 20 wt % of $Na_2O$, 2 wt % to 6 wt % of $Al_2O_3$, 0 wt % to 3 wt % of MgO, 0.5 wt % to 2 wt % of $B_2O_3$, 0 wt % to 1 wt % of $K_2O$, and 1 wt % to 3 wt % of $SO_3$.

Step 2, glass fibers, the ashes and an additive are mixed in proportion, maintained at a temperature of 400° C. to 700° C. for 30 to 90 minutes to burn out organic matters in the glass fibers (this step can be omitted when an energy density is generally high or the mixture is gradually heated in a cold cap layer in actual production of a vitrification melting furnace), and then maintained at a temperature of 1100° C. to 1400° C. for 1 to 3 hours to obtain glass melt; the glass melt is poured and molded to prepare a vitrified form; the vitrified form is annealed at 500° C. to 600° C. and maintained at the temperature for 1 to 3 hours, and then naturally cooled to room temperature to obtain a mixed waste vitrified form.

The glass fibers include the following components in terms of the weight percentage of oxides: 50 wt % to 85 wt % of $SiO_2$, 1 wt % to 10 wt % of $B_2O_3$, 5 wt % to 15 wt % of CaO, 0 wt % to 6 wt % of $K_2O$, 1 wt % to 15 wt % of $Na_2O$, 5 wt % to 8 wt % of $Al_2O_3$, 0 wt % to 5 wt % of BaO, 0 wt % to 5 wt % of ZnO, 0 wt % to 0.5 wt % of MgO, 0 wt % to 0.5 wt % of $TiO_2$, 0 wt % to 0.5 wt % of $Fe_2O_3$, and 0 wt % to 0.5 wt % of $SO_3$.

The glass fibers, the ashes and the additive are in proportion as follows: 5 wt % to 90 wt % of the glass fibers, 10 wt % to 90 wt % of the ashes and not more than 10 wt % of the additive, and the total content of the three is 100 wt %.

The additive adopts one or more of CaO, $Li_2O$, $Na_2O$ and $B_2O_3$. CaO is introduced in the form of $CaCO_3$, $Li_2O$ is introduced in the form of $Li_2CO_3$, $Na_2O$ is introduced in the form of $Na_2CO_3$, and $B_2O_3$ is introduced in the form of $B_2O_3$ or $H_3BO_3$. CaO, $Li_2O$ and $Na_2O$ are glass network modifiers, which can lower a melting temperature and a viscosity of glass at a high temperature. However, $Li_2O$ and $Na_2O$ reduce the chemical durability of glass, while CaO generally improves the chemical durability of glass. As a basic composition of borosilicate glass, $B_2O_3$ is a glass network former.

The glass fibers take $SiO_2$ as a main component, and $SiO_2$ is a glass network former and a basic composition of borosilicate glass. Excessive $SiO_2$ will cause increase of the viscosity of glass at a high temperature and affect the melting efficiency. Therefore, there are no more than 90 wt % of glass fibers. Although the ashes of combustible wastes such as cotton, plastic, rubber and absorbent paper have a great difference in composition, but all mainly include CaO, $SiO_2$, $Al_2O_3$, $TiO_2$ and $Na_2O$. $Al_2O_3$ is a glass network intermediate, which generally enhances the chemical durability of glass and resists the tendency of devitrification of glass, while $TiO_2$ can easily cause devitrification of glass. Therefore, the above ashes are in proportion within a range from 10 wt % to 90 wt %, and are combined according to set proportions.

The mixed waste vitrified form obtained by the above method includes: 30 wt % to 55 wt % of $SiO_2$, 5 wt % to 35 wt % of CaO, 2 wt % to 15 wt % of $B_2O_3$, 5 wt % to 10 wt % of $Al_2O_3$, 5 wt % to 12 wt % of $Na_2O$, 1 wt % to 6 wt % of $K_2O$, 0 wt % to 12 wt % of $TiO_2$, 1 wt % to 5 wt % of BaO, 1 wt % to 5 wt % of ZnO, 0 wt % to 5 wt % of MgO, 0 wt % to 1 wt % of $Fe_2O_3$, 0 wt % to 5 wt % of $P_2O_5$, and 0 wt % to 1 wt % of $SO_3$.

If a tracer agent is added into the mixed waste vitrified form, the mixed waste vitrified form should further include $Co_2O_3$, SrO and $Cs_2O$, each of which has a content of not more than 1 wt %.

In the technical solutions of the present disclosure, the medium and low-level radioactive glass fibers are simulated by adopting glass fibers free of nuclear radiation pollution and provided by a nuclear power plant; the combustible solid nuclear waste is respectively simulated by cotton, plastic, rubber and absorbent paper free of nuclear radiation pollution and provided by a nuclear power plant; and based on the above raw materials, $Co_2O_3$, SrO and $Cs_2O$ are further introduced as simulative nuclides (the tracer agent mentioned in the above solutions) to simulate a nominal composition of the mixed waste vitrified form.

Embodiment 1

The composition of a waste source plays a vital role in the design of a glass formula. An XRF and an ICP-OES were used to analyze the composition of ashes simulated by glass fibers, cotton, PE plastic, rubber and absorbent paper free of nuclear radiation pollution and provided by a certain nuclear power plant after waste incineration, and results are listed in Table 1. The above waste components listed in Table 1 are merely examples. In actual working conditions, the waste components will have variations due to factors such as manufacturers, batches and usage.

TABLE 1

Components of combustible ashes and glass fibers (wt %, in terms of oxides)

| Components | Cotton | PE plastic | Rubber | Absorbent paper | Glass fibers |
|---|---|---|---|---|---|
| $SiO_2$ | 34.82 | 63.22 | 0.54 | | 56.73 |
| $B_2O_3$ | | 0.19 | | 0.78 | 5.52 |
| $Na_2O$ | 6.81 | | | 18.32 | 6.83 |
| $K_2O$ | 2.34 | | | 0.83 | 5.91 |
| $Al_2O_3$ | 9.66 | 22.42 | 0.31 | 4.37 | 6.39 |
| CaO | 5.85 | 10.85 | 84.07 | 12.05 | 11.53 |
| MgO | 5.03 | 1.63 | 2.79 | 2.39 | 0.37 |
| BaO | 14.09 | 0.10 | | | 3.57 |
| ZnO | 0.31 | | 3.14 | | 2.72 |
| $TiO_2$ | 13.90 | 0.19 | 5.93 | 58.96 | 0.13 |
| $Fe_2O_3$ | 0.71 | | | 0.44 | 0.13 |
| SrO | | 0.64 | | | |
| $P_2O_5$ | 4.49 | 0.60 | 0.22 | 0.13 | |
| $SO_3$ | 1.98 | 0.14 | 3.00 | 1.73 | 0.17 |
| SUM | 100.00 | 100.00 | 100.00 | 100.00 | 100.00 |

According to this embodiment, 60 wt % of a glass fiber oxide, 30 wt % of a cotton ash oxide, 5 wt % of a chemical additive CaO, and 5 wt % of a chemical additive $Na_2O$ in terms of a final vitrified form were proportioned, simulated nuclides containing 0.2 wt % of $Co_2O_3$, 0.2 wt % of SrO and 0.2 wt % of $Cs_2O$ were added, and homogeneous mixing was conducted (that is, the glass fibers, the combustible waste ashes and the chemical additive oxides account for 99.4 wt % of the final vitrified form, and the simulated nuclides account for 0.6 wt % of the final vitrified form, similarly hereinafter; the nominal composition of a glass formula is shown in Table 2); 20 g of a resulting mixture was weighed and placed in a 100 mL corundum crucible; the corundum crucible was transferred and maintained in a muffle furnace at 550° C. for 1 hour and subsequently maintained in a muffle furnace at 1300° C. for 1 hour; afterwards, the crucible was taken out by using crucible tongs; glass melt was poured on a preheated copper plate and molded to obtain a vitrified form; and finally the vitrified form was annealed at 500° C. for 2 hours and furnace cooled.

Figure 2:
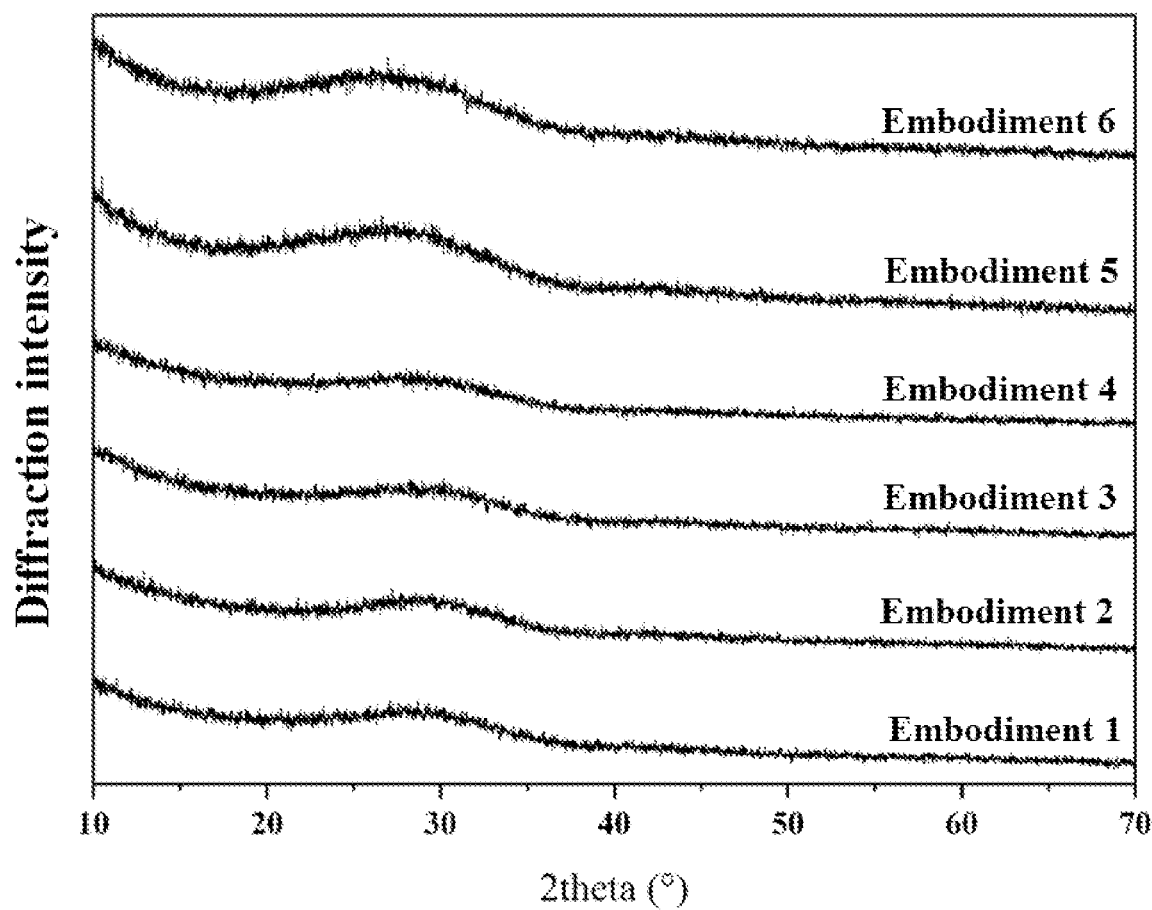
FIG. 2 is an XRD pattern of vitrified forms obtained in six embodiments of the present disclosure.

An optical microscope was used for observation, which showed that the vitrified form prepared in this embodiment is homogeneous and contains no other inclusions. An XRD diffraction pattern presents a typical amorphous hump (FIG. 2), which proves that the vitrified form prepared is glassy. An Archimedes principle was used to measure a density, which was 2.73 g/cm$^3$. A heavy hammer freefall impact method in Appendix D of characterization of radioactive waste forms and packages (EJ1186-2005) was used to measure an SA/E value, which was 10.5 cm$^2$/J and meets the requirements (not higher than 12 cm$^2$/J) of the impact resistance of the vitrified form in EJ1186-2005. An internationally common method was used for testing the chemical durability of the vitrified form: a product consistency test (PCT) (ASTM C 1285-02) was conducted; the chemical durability of the prepared vitrified form was evaluated; Table 3 shows results of 7-day PCT normalized releases of the vitrified form, where the values for normalized releases of elements were all lower than 0.2 g/m$^2$, which meets the chemical durability requirements of this vitrified form.

Embodiment 2

According to this embodiment, 60 wt % of a glass fiber oxide, 20 wt % of a cotton ash oxide, 20 wt % of a rubber ash oxide, and 0 wt % of a chemical additive oxide in terms of a final vitrified form (that is, no additional additive was used) were proportioned, simulated nuclides containing 0.2 wt % of $Co_2O_3$, 0.2 wt % of SrO and 0.2 wt % of $Cs_2O$ were added, and homogeneous mixing was conducted (the nominal composition of a glass formula is shown in Table 2); 20 g of a resulting mixture was weighed and placed in a 100 mL corundum crucible; the corundum crucible was transferred and maintained in a muffle furnace at 1300° C. for 1 hour; afterwards, the crucible was taken out by using crucible tongs; glass melt was poured on a preheated copper plate and molded to obtain a vitrified form; and finally the vitrified form was annealed at 500° C. for 2 hours and furnace cooled.

An optical microscope was used for observation, which showed that the vitrified form prepared in this embodiment is homogeneous and contains no other inclusions. An XRD diffraction pattern presents a typical amorphous hump (FIG. 2), which proves that the vitrified form prepared is glassy. An Archimedes principle was used to measure a density, which was 2.78 g/cm$^3$. A heavy hammer freefall impact method was used to measure an SA/E value, which was 11.4 cm$^2$/J. Table 3 shows results of 7-day PCT normalized releases of the vitrified form, where the values for normalized releases of elements were all lower than 0.2 g/m$^2$, which meets the chemical durability requirements of this vitrified form.

Embodiment 3

According to this embodiment, 45 wt % of a glass fiber oxide, 36 wt % of a cotton ash oxide, 9 wt % of a plastic ash oxide, and 10 wt % of a chemical additive CaO in terms of a final vitrified form were proportioned, simulated nuclides containing 0.2 wt % of $Co_2O_3$, 0.2 wt % of SrO and 0.2 wt % of $Cs_2O$ were added, and homogeneous mixing was conducted (the nominal composition of a glass formula is shown in Table 2); 20 g of a resulting mixture was weighed and placed in a 100 mL corundum crucible; the corundum crucible was maintained in a muffle furnace at 1300° C. for 1 hour; afterwards, the crucible was taken out by using crucible tongs; glass melt was poured on a preheated copper plate and molded to obtain a vitrified form; and finally the vitrified form was annealed at 500° C. for 2 hours and furnace cooled.

An optical microscope was used for observation, which showed that the vitrified form prepared in this embodiment is homogeneous and contains no other inclusions. An XRD diffraction pattern presents a typical amorphous hump (FIG. 2), which proves that the vitrified form prepared is glassy. An Archimedes principle was used to measure a density, which was 2.82 g/cm$^3$. A heavy hammer freefall impact method was used to measure an SA/E value, which was 11.2 cm$^2$/J. Table 3 shows results of 7-day PCT normalized releases of the vitrified form, where the values for normalized releases of elements were all lower than 0.2 g/m$^2$, which meets the chemical durability requirements of this vitrified form.

Embodiment 4

According to this embodiment, 72 wt % of a glass fiber oxide, 18 wt % of an absorbent paper oxide, and 10 wt % of a chemical additive CaO in terms of a final vitrified form were proportioned, simulated nuclides containing 0.2 wt % of $Co_2O_3$, 0.2 wt % of SrO and 0.2 wt % of $Cs_2O$ were added, and homogeneous mixing was conducted (the nominal composition of a glass formula is shown in Table 2); 20 g of a resulting mixture was weighed and placed in a 100 mL corundum crucible; the corundum crucible was maintained in a muffle furnace at 1300° C. for 1 hour; afterwards, the crucible was taken out by using crucible tongs; glass melt was poured on a preheated copper plate and molded to obtain a vitrified form; and finally the vitrified form was annealed at 500° C. for 2 hours and furnace cooled.

An optical microscope was used for observation, which showed that the vitrified form prepared in this embodiment is homogeneous and contains no other inclusions. An XRD diffraction pattern presents a typical amorphous hump (FIG. 2), which proves that the vitrified form prepared is glassy. An Archimedes principle was used to measure a density, which was 2.76 g/cm$^3$. A heavy hammer freefall impact method was used to measure an SA/E value, which was 9.15 cm$^2$/J. Table 3 shows results of 7-day PCT normalized releases of the vitrified form, where the values for normalized releases of elements were all lower than 1 g/m$^2$, which meets the chemical durability requirements of this vitrified form.

Embodiment 5

According to this embodiment, 60 wt % of a glass fiber oxide, 20 wt % of a cotton ash oxide, 10 wt % of a rubber ash oxide, 10 wt % of a plastic ash oxide, and 0 wt % of a chemical additive in terms of a final vitrified form were proportioned, simulated nuclides containing 0.2 wt % of $Co_2O_3$, 0.2 wt % of SrO and 0.2 wt % of $Cs_2O$ were added, and homogenous mixing was conducted (the nominal composition of a glass formula is shown in Table 2); 20 g of a resulting mixture was weighed and placed in a 100 mL corundum crucible; the corundum crucible was maintained in a muffle furnace at 1300° C. for 1 hour; afterwards, the crucible was taken out by using crucible tongs; glass melt was poured on a preheated copper plate and molded to obtain a vitrified form; and finally the vitrified form was annealed at 500° C. for 2 hours and furnace cooled.

An optical microscope was used for observation, which showed that the vitrified form prepared in this embodiment is homogeneous and contains no other inclusions. An XRD diffraction pattern presents a typical amorphous hump (FIG. 2), which proves that the vitrified form prepared is glassy. An Archimedes principle was used to measure a density, which was 2.72 g/cm$^3$. Table 3 shows results of 7-day PCT normalized releases of the vitrified form, where the values for normalized releases of elements were all lower than 1 g/m$^2$, which meets the chemical durability requirements of this vitrified form.

Embodiment 6

Combustible waste sources terms are complex, which is not conducive to the development of mixed formulations of multiple wastes. For example, if the absorbent paper contains too much $TiO_2$, devitrification of glass is easily caused. In order to reduce the tendency of devitrification of glass, it is necessary to control a content of the absorbent paper ash to be within 10 wt % in a vitrified form mixed with five kinds of wastes. According to this embodiment, 60 wt % of a glass fiber oxide, 20 wt % of a cotton ash oxide, 10 wt % of a plastic ash oxide, 5 wt % of a rubber ash oxide, 5 wt % of an absorbent paper ash oxide and 0 wt % of a chemical additive in terms of a final vitrified form were proportioned, simulated nuclides containing 0.2 wt % of $Co_2O_3$, 0.2 wt % of SrO and 0.2 wt % of $Cs_2O$ were added, and homogeneous mixing was conducted (the nominal composition of a glass formula is shown in Table 2); 20 g of a resulting mixture was weighed and placed in a 100 mL corundum crucible; the corundum crucible was maintained in a muffle furnace at 1300° C. for 1 hour; afterwards, the crucible was taken out by using crucible tongs; glass melt was poured on a preheated copper plate and molded to obtain a vitrified form; and finally the vitrified form was annealed at 500° C. for 2 hours and furnace cooled.

An optical microscope was used for observation, which showed that the vitrified form prepared in this embodiment is homogeneous and contains no other inclusions. An XRD diffraction pattern presents a typical amorphous hump (FIG. 2), which proves that the vitrified form prepared is glassy. An Archimedes principle was used to measure a density, which was 2.70 g/cm³. Table 3 shows results of 7-day PCT normalized releases of the vitrified form, where the values for normalized releases of elements were all lower than 1 g/m², which meets the chemical durability requirements of this vitrified form.

TABLE 2

Nominal components (wt %, in terms of oxides) of waste glass formula in each

| Components | Embodiment 1 | Embodiment 2 | Embodiment 3 | Embodiment 4 | Embodiment 5 | Embodiment 6 |
|---|---|---|---|---|---|---|
| $SiO_2$ | 44.22 | 40.86 | 41.06 | 40.60 | 47.11 | 47.09 |
| $B_2O_3$ | 3.29 | 3.29 | 2.47 | 4.09 | 3.29 | 3.34 |
| $Al_2O_3$ | 6.69 | 5.79 | 9.15 | 5.36 | 8.01 | 8.25 |
| CaO | 13.59 | 24.73 | 16.36 | 20.35 | 17.47 | 14.04 |
| $Na_2O$ | 11.07 | 5.43 | 4.74 | 8.17 | 5.43 | 5.43 |
| $K_2O$ | 4.22 | 4.00 | 4.21 | 4.38 | 4.00 | 3.99 |
| BaO | 6.33 | 4.93 | 2.57 | 2.55 | 4.94 | 4.94 |
| MgO | 1.72 | 1.77 | 3.42 | 0.69 | 1.66 | 1.67 |
| ZnO | 1.71 | 2.31 | 2.78 | 1.95 | 1.99 | 1.84 |
| $TiO_2$ | 4.22 | 4.02 | 10.90 | 10.64 | 3.45 | 6.78 |
| $Fe_2O_3$ | 0.29 | 0.24 | 0.31 | 0.17 | 0.23 | 0.26 |
| $Cs_2O$ | 0.20 | 0.20 | 0.20 | 0.20 | 0.20 | 0.20 |
| SrO | 0.20 | 0.20 | 0.20 | 0.20 | 0.26 | 0.26 |
| $Co_2O_3$ | 0.20 | 0.20 | 0.20 | 0.20 | 0.20 | 0.20 |
| $P_2O_5$ | 1.34 | 0.94 | 0.88 | 0.02 | 0.97 | 0.96 |
| $SO_3$ | 0.69 | 1.09 | 0.55 | 0.43 | 0.79 | 0.75 |
| SUM | 100.00 | 100.00 | 100.00 | 100.00 | 100.00 | 100.00 |

TABLE 3

Results of 7-day PCT normalized releases of vitrified form in each embodiment

| Elements | Embodiment 1 $r_i$ (g/m²) | Embodiment 2 $r_i$ (g/m²) | Embodiment 3 $r_i$ (g/m²) | Embodiment 4 $r_i$ (g/m²) | Embodiment 5 $r_i$ (g/m²) | Embodiment 6 $r_i$ (g/m²) |
|---|---|---|---|---|---|---|
| Na | 0.1312 | 0.1056 | 0.1290 | 0.6230 | 0.4138 | 0.1478 |
| K | 0.0430 | 0.0450 | 0.0436 | 0.2060 | 0.2002 | 0.0460 |
| B | 0.1004 | 0.1058 | 0.1048 | 0.0000 | 0.0000 | 0.1417 |
| Ca | 0.0086 | 0.0345 | 0.0360 | 0.0247 | 0.0164 | 0.0419 |
| Ba | 0.0286 | 0.0354 | 0.0135 | 0.0029 | 0.0212 | 0.0259 |
| Mg | 0.0006 | 0.0007 | 0.0005 | 0.0000 | 0.0000 | 0.0002 |
| Al | 0.0476 | 0.0539 | 0.0211 | 0.0509 | 0.0389 | 0.0234 |
| Si | 0.0662 | 0.0712 | 0.0951 | 0.1003 | 0.0764 | 0.1091 |
| Ti | 0.0003 | 0.0001 | 0.0000 | 0.0000 | 0.0000 | 0.0000 |
| Zn | 0.0002 | 0.0002 | 0.0000 | 0.0000 | 0.0000 | 0.0000 |
| P | 0.0013 | 0.0016 | 0.0302 | 0.0000 | 0.0000 | 0.0315 |
| Cs | 0.0000 | 0.0000 | 0.0530 | 0.0000 | 0.0713 | 0.0435 |
| Sr | 0.0277 | 0.0803 | 0.0316 | 0.0178 | 0.0266 | 0.0411 |
| Co | 0.0007 | 0.0012 | 0.0000 | 0.0004 | 0.0000 | 0.0000 |
| SUM | 0.4564 | 0.5355 | 0.5584 | 1.0260 | 0.8648 | 0.6521 |

Preferred embodiments of the present disclosure are described in detail above. It should be understood that various modifications and variations can be made in accordance with the concepts of the present disclosure without creative effort by those of ordinary skill in the art. Therefore, any technical solution that can be obtained by those skilled in the art by logical analysis, reasoning or limited experiments based on the prior art according to the concepts of the present disclosure should fall within the protection scope determined by the claims.

What is claimed is:

1. A method for synergistically vitrifying medium and low-level radioactive glass fibers and combustible solid nuclear waste incineration ashes, comprising the following steps of:
   incinerating a combustible solid nuclear waste to obtain ashes, wherein the combustible solid nuclear waste is at least one member selected from the group consisting of cotton, plastic, rubber and absorbent paper; and
   mixing the glass fibers, the ashes and an additive in proportion to prepare a mixed waste vitrified form,
   wherein the glass fibers, the ashes and the additive are in proportion as follows:
   5 wt % to 90 wt % of the glass fibers,
   10 wt % to 90 wt % of the ashes, and
   not more than 10 wt % of the additive,
   a total content of the glass fibers, the ashes and the additive is 100 wt %, and
   the glass fibers, the ashes and the additive are proportioned in terms of oxides.

2. The method for synergistically vitrifying medium and low-level radioactive glass fibers and combustible solid nuclear waste incineration ashes according to claim 1, wherein the glass fibers, the ashes and the additive are fully mixed to obtain a resulting mixture and then the following steps are conducted:
   maintaining the resulting mixture at 1100° C. to 1400° C. for 1 to 3 hours to obtain glass melt;
   pouring and molding the glass melt to prepare a vitrified form; and
   annealing the vitrified form at 500° C. to 600° C., maintaining the temperature for 1 to 3 hours, and then naturally cooling to room temperature to obtain the mixed waste vitrified form.

3. The method for synergistically vitrifying medium and low-level radioactive glass fibers and combustible solid nuclear waste incineration ashes according to claim 1, wherein the additive is at least one member selected from the group consisting of CaO, $Li_2O$, $Na_2O$ and $B_2O_3$, wherein CaO is introduced in a form of $CaCO_3$, $Li_2O$ is introduced in a form of $Li_2CO_3$, $Na_2O$ is introduced in a form of $Na_2CO_3$, and $B_2O_3$ is introduced in a form of $B_2O_3$ or $H_3BO_3$.

4. The method for synergistically vitrifying medium and low-level radioactive glass fibers and combustible solid nuclear waste incineration ashes according to claim 1, wherein the mixed waste vitrified form comprises 30 wt % to 55 wt % of $SiO_2$, 5 wt % to 35 wt % of CaO, 2 wt % to 15 wt % of $B_2O_3$, 5 wt % to 10 wt % of $Al_2O_3$, 5 wt % to 12 wt % of $Na_2O$, 1 wt % to 6 wt % of $K_2O$, 0 wt % to 12 wt % of $TiO_2$, 1 wt % to 5 wt % of BaO, 1 wt % to 5 wt % of ZnO, 0 wt % to 5 wt % of MgO, 0 wt % to 1 wt % of $Fe_2O_3$, 0 wt % to 5 wt % of $P_2O_5$, and 0 wt % to 1 wt % of $SO_3$.

5. The method for synergistically vitrifying medium and low-level radioactive glass fibers and combustible solid nuclear waste incineration ashes according to claim 4, wherein the mixed waste vitrified form further comprises $Co_2O_3$, SrO and $Cs_2O$, each of which has a content not higher than 1 wt %.

6. The method for synergistically vitrifying medium and low-level radioactive glass fibers and combustible solid nuclear waste incineration ashes according to claim 1, wherein the combustible solid nuclear waste is selected from the group consisting of any one of the cotton, the plastic, the rubber and the absorbent paper.

7. The method for synergistically vitrifying medium and low-level radioactive glass fibers and combustible solid nuclear waste incineration ashes according to claim 1, wherein the combustible solid nuclear waste are two members selected from the group consisting of the cotton, the plastic, the rubber and the absorbent paper.

8. The method for synergistically vitrifying medium and low-level radioactive glass fibers and combustible solid nuclear waste incineration ashes according to claim 1, wherein the combustible solid nuclear waste are three members selected from the group consisting of the cotton, the plastic, the rubber and the absorbent paper.

9. The method for synergistically vitrifying medium and low-level radioactive glass fibers and combustible solid nuclear waste incineration ashes according to claim 1, wherein the combustible solid nuclear waste is a combination of the cotton, the plastic, the rubber and the absorbent paper.

* * * * *